United States Patent
DeLuca et al.

(10) Patent No.: US 9,807,220 B2
(45) Date of Patent: Oct. 31, 2017

(54) PREVENTING ACCIDENTAL PHONE CALL SESSION TERMINATION

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 14/851,366

(22) Filed: Sep. 11, 2015

(65) Prior Publication Data

US 2017/0078473 A1 Mar. 16, 2017

(51) Int. Cl.
*H04M 1/06* (2006.01)
*G06F 3/041* (2006.01)
*H04M 1/725* (2006.01)
*H04W 76/06* (2009.01)

(52) U.S. Cl.
CPC ....... *H04M 1/72519* (2013.01); *H04W 76/06* (2013.01); *H04M 1/72566* (2013.01); *H04M 2250/62* (2013.01); *H04M 2250/74* (2013.01)

(58) Field of Classification Search
CPC ........ G06F 3/017; G06F 3/0412; G06F 3/044; G06F 9/30; G06F 2203/04101; G06F 2203/04104; H04M 1/72519; H04M 1/72569; H04M 2250/12; H04M 1/605
USPC ...... 455/414.1, 418, 566, 567; 345/173, 174
See application file for complete search history.

(56) References Cited

U.S. PATENT DOCUMENTS

| 8,395,594 | B2 | 3/2013 | Karhiniemi | |
|---|---|---|---|---|
| 8,509,757 | B2 | 8/2013 | Schlueter | |
| 8,890,823 | B2 | 11/2014 | Alameh et al. | |
| 2008/0119217 | A1 | 5/2008 | Coxhill | |
| 2013/0176264 | A1* | 7/2013 | Alameh | G06F 3/038 345/174 |
| 2013/0203397 | A1 | 8/2013 | Vidal et al. | |
| 2014/0045453 | A1* | 2/2014 | Johnson | H04M 1/274566 455/406 |
| 2014/0342685 | A1* | 11/2014 | Biswas | H04W 4/22 455/404.1 |
| 2015/0002441 | A1* | 1/2015 | Brunet | G06F 3/044 345/174 |

(Continued)

OTHER PUBLICATIONS ip.com, "Providing Preventive Warning Messages to Users using Various Interactive Applications", an IP.com Prior Art Database Technical Disclosure, Authors et al. Disclosed Anonymously, IP.com No. 000236733, IP.com Electronic Publication Date May 13, 2014, 3 pages.

*Primary Examiner* — Khawar Iqbal
(74) *Attorney, Agent, or Firm* — Maeve M. Carpenter; Hunter E. Webb; Keohane & D'Alessandro PLLC

(57) ABSTRACT

Embodiments described herein provide approaches for preventing an accidental termination of a phone call session. Specifically, a user establishes a phone call session using a phone call device. During the phone call session, the user performs an action related to terminating the phone call session. A likely intent of the user to terminate the phone call session is determined based on one or more predefined factors. Based on the determined user intent, the phone call session may be terminated or allowed to continue.

20 Claims, 3 Drawing Sheets

(56) References Cited

U.S. PATENT DOCUMENTS

| | | | | |
|---|---|---|---|---|
| 2015/0304603 | A1* | 10/2015 | Yoon | H04W 76/028 348/14.07 |
| 2016/0072944 | A1* | 3/2016 | Noda | H04M 1/72519 455/566 |
| 2016/0261996 | A1* | 9/2016 | Malik | H04W 4/22 |
| 2017/0104858 | A1* | 4/2017 | Mizumoto | H04M 1/0266 |

* cited by examiner

PREVENTING ACCIDENTAL PHONE CALL SESSION TERMINATION

BACKGROUND

This invention relates generally to facilitating a phone call session and, more specifically, to preventing an accidental termination of the phone call session during a conversation.

A phone call device is a telecommunications device that permits two or more users to conduct a conversation when they are too far apart to be heard directly. The device converts sound, typically and most efficiently the human voice, into electronic signals suitable for transmission via cables or other transmission media over long distances and replays such signals simultaneously in audible form to its user. When the conversation ends, each party will "hang up" his/her phone call device, thereby terminating the respective party's phone connection to the other parties.

SUMMARY

In general, embodiments described herein provide approaches for preventing an accidental termination of a phone call session. Specifically, a user establishes a phone call session using a phone call device. During the phone call session, the user performs an action related to terminating the phone call session. A likely intent of the user to terminate the phone call session is determined based on one or more predefined factors. Based on the determined user intent, the phone call session may be terminated or allowed to continue.

One aspect of the present invention includes a computer-implemented method for preventing an accidental termination of a phone call session, comprising: establishing the phone call session; receiving a user action by a user during the phone call session related to terminating the phone call session; determining a likely intent of the user to terminate the phone call session based on one or more predefined factors; and performing a phone call session action based on the likely intent.

Another aspect of the present invention includes a computer system preventing an accidental termination of a phone call session, the computer system comprising: a memory medium comprising program instructions; a bus coupled to the memory medium; and a processor for executing the program instructions, the instructions causing the system to: establish the phone call session; receive an action by a user during the phone call session related to terminating the phone call session; determine a likely intent of the user to terminate the phone call session based on one or more predefined factors; and perform a phone call session action based on the likely intent.

Yet another aspect of the present invention includes a computer program product for preventing an accidental termination of a phone call session, the computer program product comprising a computer readable storage device, and program instructions stored on the computer readable storage device, to: establish the phone call session; receive an action by a user during the phone call session related to terminating the phone call session; determine a likely intent of the user to terminate the phone call session based on one or more predefined factors; and perform a phone call session action based on the likely intent.

Yet still another aspect of the present invention includes a method for preventing an accidental termination of a phone call session, comprising: providing a computer infrastructure that includes at least one computer device that operates to perform the steps of: establishing the phone call session; receiving an action by a user during the phone call session related to terminating the phone call session; determining a likely intent of the user to terminate the phone call session based on one or more predefined factors; and performing a phone call session action based on the likely intent.

BRIEF DESCRIPTION OF THE DRAWINGS

These and other features of this invention will be more readily understood from the following detailed description of the various aspects of the invention taken in conjunction with the accompanying drawings in which.

Figure 1B:
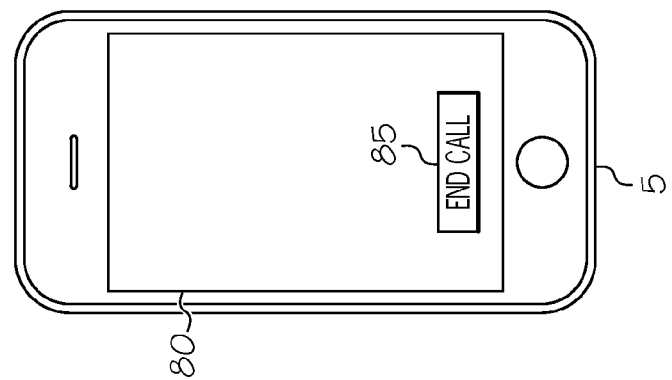
FIGS. 1A and 1B each show an example phone call device 5 according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Phone call devices can include a variety of different types of buttons depending upon the device model. Occasionally, events occur that cause inadvertent triggering of a phone call device button causing the accidental termination of a phone call. For example, a caller may attempt to raise or lower the volume on a mobile phone but hits a power button instead, resulting in an accidental termination of the call. In view of these events, the inventors of the present invention have discovered a system and method for implementation in electronic devices, such as mobile electronic devices, so that consequences of inadvertent pressing of a button causing a call termination can be partly or entirely avoided.

As stated above, embodiments described herein provide approaches for preventing an accidental termination of a phone call session. Specifically, a user establishes a phone call session using a phone call device. During the phone call session, the user performs an action related to terminating the phone call session. A likely intent of the user to terminate the phone call session is determined based on one or more predefined factors. Based on the determined user intent, the phone call session may be terminated or allowed to continue.

Figure 1A:
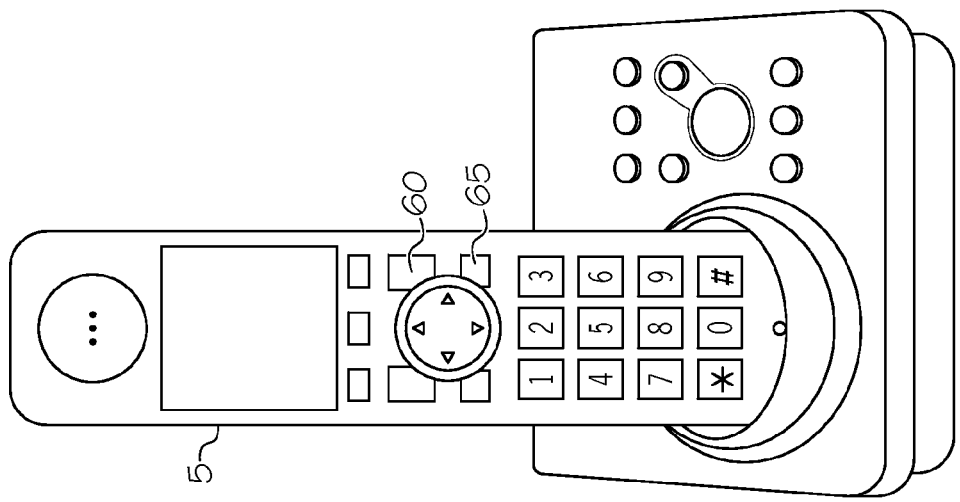

FIGS. 1A and 1B show an example phone call device 5 according to illustrative embodiments. Phone call device 5 may include a smart phone, a cellular phone, a Voice over Internet Protocol (VoIP) phone, a personal data assistant (PDA), a landline phone, a tablet, or the like. Phone call device 5 may include one or more physical buttons and/or virtual buttons for invoking different device functions. A physical button is a permanent hardware button on a device, while a virtual button can exist on certain electronic devices (e.g., smart phones, tablets, etc.) having a display or touch screen.

FIG. 1A shows a landline phone call device 5 with physical buttons. Landline phones use metal wire telephone lines for transmission as distinguished from mobile cellular lines. As shown, phone call device 5 of FIG. 1A includes 'Off' button 60 and 'Mute' button 65. As discussed earlier, inadvertent triggering of a phone device button can cause an accidental termination of a phone call. For example, a conference call participant calling from an environment having a high level of background noise may wish to place his/her phone call device on mute when not speaking so as to not disrupt the call. When the call participant wants to speak, he/she may scramble to unmute the call by pressing 'Mute' button 65. During that scramble, the call participant might accidentally hang up by pressing 'Off' button 60, requiring the call participant to dial back into the call which disrupts the entire flow of the conversation.

FIG. 1B shows a portable phone call device 5 with a touch screen and virtual buttons. Portable phones, such as smart phones, have become ubiquitous in the United States. Most smart phones can access the Internet, have a touch screen user interface, can run third-party applications, music players, and are camera phones. As shown, phone call device 5 of FIG. 1B includes touch screen 80 having 'End Call' virtual button 85. As with physical buttons, inadvertent triggering of a virtual button can cause the accidental termination of a phone call. For example, a caller's cheek or finger may inadvertently hit 'End Call' virtual button 85 during an active conversation causing the phone call to be accidentally terminated.

Figure 2:
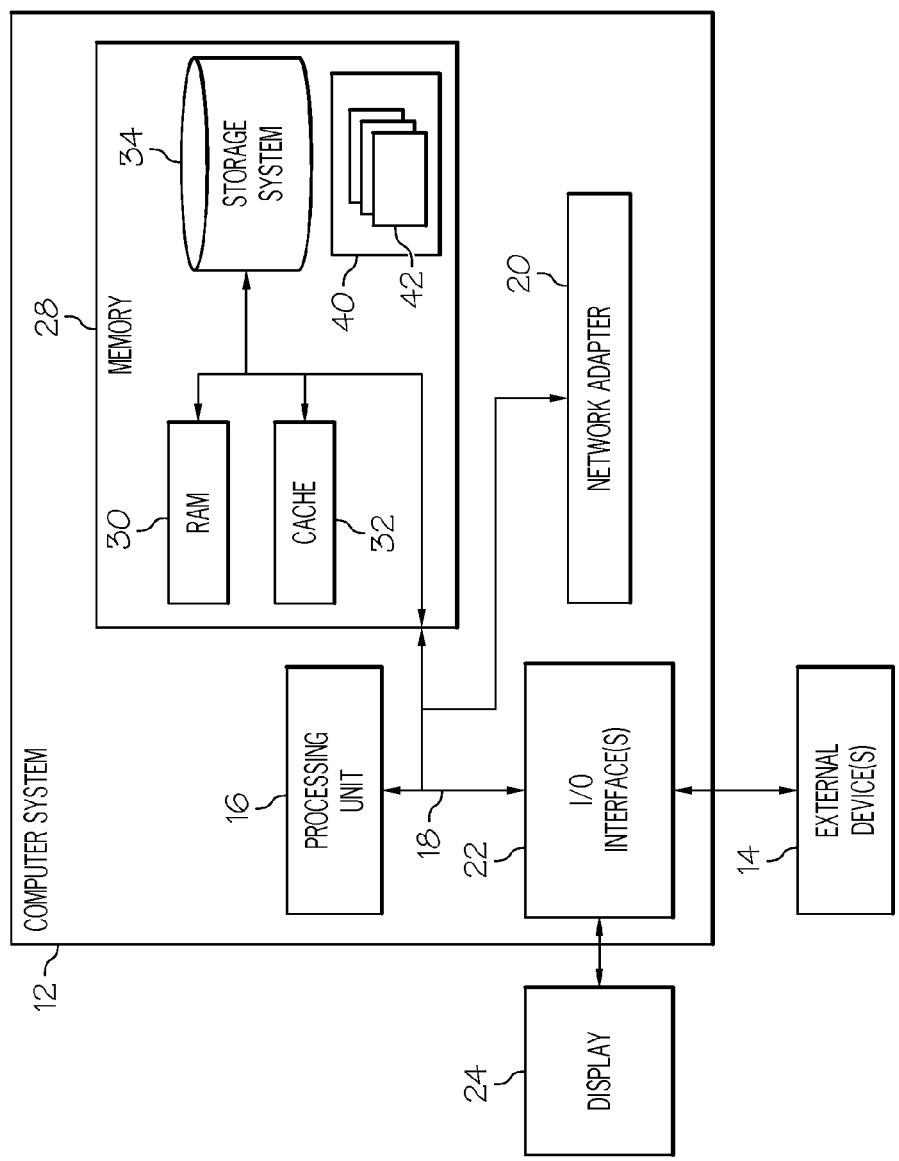
FIG. 2 shows a block diagram that illustrates a computer implementation 10 for a phone call device 5, such as that shown in FIG. 1, according to illustrative embodiments.

FIG. 2 is a block diagram that illustrates a computer implementation 10 for a phone call device 5, such as that shown in FIG. 1, according to an embodiment of the present invention. The preferred embodiment is implemented using one or more computer programs running on a portable computer, such as a phone call device 5. Thus, in this embodiment, the computer implementation 10 is a phone call device 5.

Referring now to FIG. 2, a computerized implementation 10 of an embodiment for preventing an accidental termination of the phone call session during a conversation will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for preventing an accidental termination of the phone call session during a conversation. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for preventing an accidental termination of the phone call session during a conversation, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 3:
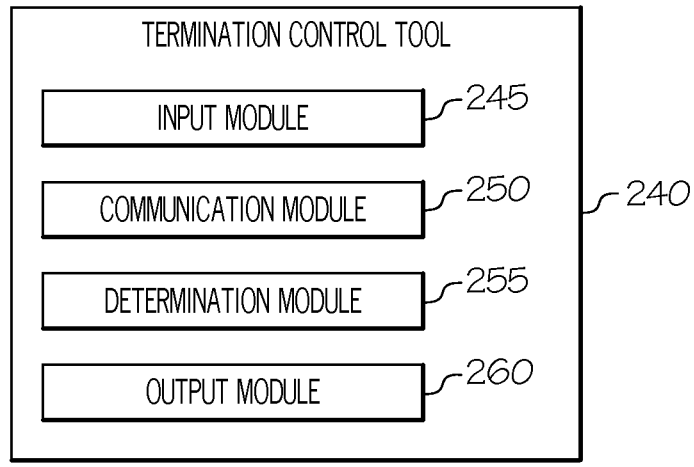
FIG. 3 shows a block diagram that illustrates a termination control tool 240 according to illustrative embodiments.

Referring now to FIG. 3, phone call device 5 (as shown in FIG. 1) may include, but is not limited to, a smart phone, a cellular phone, a Voice over Internet Protocol (VoIP) phone, a personal data assistant (PDA), a landline phone, a tablet, or any other communication device capable of establishing a phone call session over a network. Phone call device 5 may comprise one or more user interface mechanisms, such as, but not limited to, a touch interface, a mouse, a pointer, or a voice interface. Phone call device 5 may, in some embodiments, comprise a microphone for use with voice recognition technology.

Phone call device 5 may also comprise a memory (e.g., memory 28 shown in FIG. 2) in which a termination control tool 240 resides, for example, as a program module 42 of program/utility 40 (FIG. 2). In some embodiments, termination control tool 240 may be located remotely, such as on a separate server. In any case, termination control tool 240 may comprise one or more components for carrying out embodiments of the present invention.

Termination control tool 240 may comprise input module 245. Input module 245 may be configured to permit a user to interact or interface with phone device 5. For example, input module 245 may receive information from a variety of components including, but not limited to, a touch screen, one or more physical buttons, one or more virtual buttons, a keyboard, a mouse, a joy stick, a track ball, a microphone, a camera, a video recorder, and any combinations thereof. Each input module 245 may be configured to provide one or more dedicated control functions for making selections or issuing commands associated with phone call device 5.

Termination control tool 240 may comprise communication module 250. Communication module 250 may control a phone call session connection for communicating with other call participants over a communication path. A phone call session may include, but is not limited to, a one-to-one audio call, a one-to-one video call, an audio conference call with three or more participants, or a video conference call with three or more participants. Communication module 250 may employ various signaling protocols for establishing and terminating a phone call session between phone call device 5 and one or more additional calling devices. Additionally, communication module 250 may provide for continuation of the phone call session between phone call device 5 and other calling devices participating in the phone call session.

Termination control tool 240 may comprise determination module 255. During a phone call session, a user of phone call device 5 may perform an action on phone call device 5 (e.g., pressing an 'End Call' virtual button, pressing an 'Off' physical button, etc.) indicating a likely intent of the user to terminate the user's phone call session. Determination module 255 may determine whether the action was intentional or accidental prior to terminating the user's phone call session. If determination module 255 determines the action was accidental, the user's phone call session is not terminated. The functions of determination module 255 will be discussed in greater detail below with reference to FIG. 4.

Termination control tool 240 may comprise output module 260. Output module 260 may be configured to provide output to a user of phone device 5. For example, output module 260 may provide output to a variety of components including, but not limited to, a display screen, a speaker, a storage device, a vibration component, or the like. Output module 260 may provide a variety of information and/or feedback to the user and improve user convenience in operating phone call device 5. In one embodiment, output module 260 may provide output requiring a response from a user. For example, a pop-up window may be displayed to confirm a user's action prior to initiating the action. In one example, communication module 250 may be configured to terminate or maintain the call depending on the outcome of the determination and response from the user.

Figure 4:
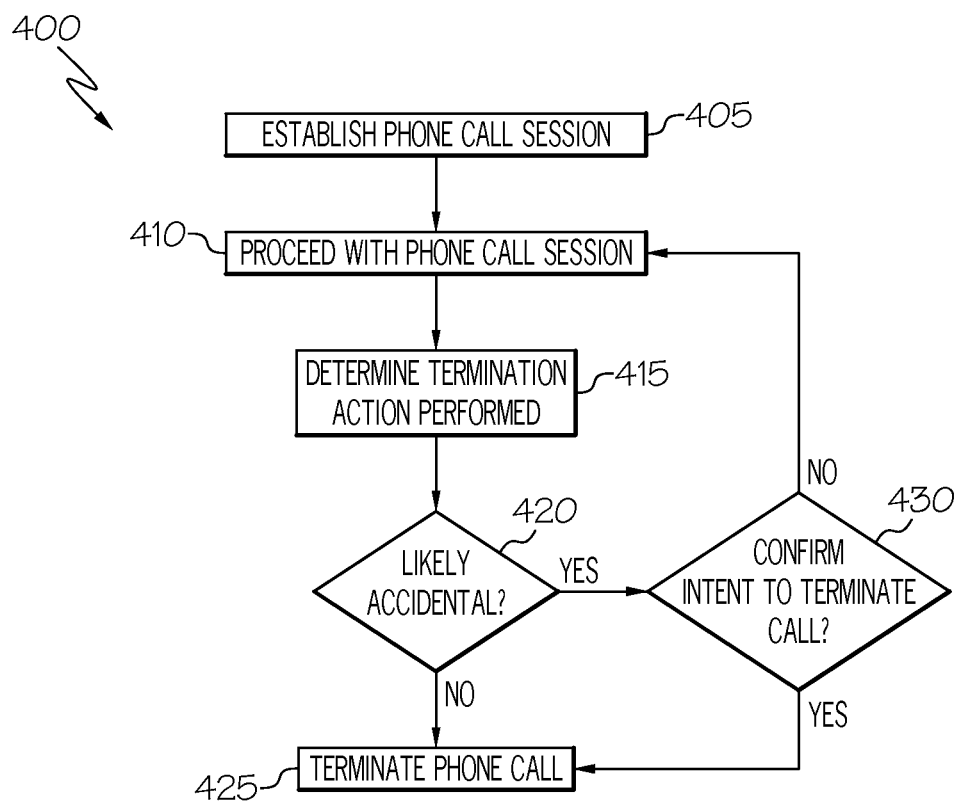
FIG. 4 shows a process flowchart 400 for preventing an accidental termination of the phone call session during a conversation according to illustrative embodiments.

Referring now to FIG. 4, in conjunction with FIGS. 1, 2, and 3, an implementation of a process 400 for preventing an accidental termination of a phone call session during a conversation according to illustrative embodiments is shown. At step 405, a caller establishes a phone call session using phone call device 5. Input module 245 may allow the user to interface with phone device 5. Communication module 250 may establish and maintain the phone call session. For example, a user may dial into a multi-party audio conference call as a participant. The user may be asked to enter a predefined code before being connected to the conference call. In some examples, once connected to the call, the user can mute his/her line or hear a list of people on the call by using certain predefined commands (e.g., dual-tone multi-frequency or 'DTMF' commands) entered on the keypad of the phone call device 5. At 410, the phone call session proceeds as the participants discuss the subject matter of the call.

At 415, termination control tool 240 receives a user action, such as the user performing an action on phone call device 5 (e.g., pressing an 'End Call' virtual button, pressing an 'Off' physical button, etc.) indicating a likely intent of the user to terminate the user's connection (i.e., hang up) to the conference call. At 420, determination module 255 may determine the likelihood the action was accidental prior to terminating the user's call. If the determination module 255 determines the action was accidental, the user's phone call session is not terminated.

Determination module 255 may determine the likelihood the user's action was accidental prior to hanging up or terminating the connection of phone call device 5. In one example, if any of the below factors are present, then the user action is determined to be likely accidental. In several illustrative examples below, factors considered in determining whether a user action performed using phone call device 5 was likely intentional are shown. For example, during a multi-party conference call, if a majority of other participants are hanging up, the user action may be determined to be intentional. In another example, voice recognition technology may be leveraged to detect the user speaking words (e.g., "goodbye", "see you later", etc.) prior to the user action that typically precede a user hanging up. In this case, the user action may be determined to be intentional. In yet another example, the number of other individuals participating in the call may be detected to determine the likely intent of the user action. For example, if it is determined the user is the only person on the call, the user action may be determined to be intentional. At 425, if it is determined that the user action was not likely accidental, the connection to the phone call will be terminated.

In additional illustrative examples below, factors considered by determination module 255 in determining whether a user action performed using phone call device 5 was likely accidental are shown. For example, during a multi-party conference call, the time of the user action and scheduled ending time of the conference call are determined. In one embodiment, the scheduled end time may be retrieved from a calendar associated with the user. If the user action was performed prior to the scheduled ending time of the call, the user action may be determined to be accidental. Similarly, the scheduled beginning time of the user's next calendar item (e.g., another conference call, meeting, etc.) may be determined. Again, this information may be retrieved from a user calendar. If the user action was performed prior to the scheduled beginning time of the user's next calendar item, the user action may be determined to be accidental.

In another example, the user may be in the process of adjusting the volume of the conference call when a user action occurs disconnecting the call. In this case, the user action may be determined to be accidental because the user likely unintentionally hit a power (or hang up) button when attempting to raise or lower the volume on phone call device 5. Similarly, the closeness of buttons (either physical or virtual) may accidentally cause a user to mistake one button for another. For example, a certain model of phone call device 5 may be configured with a mute button close to a power/hang up button. A user may be attempting to unmute the call and accidentally press the power/hang up button. In one example, the closeness of the buttons may be "learned" by termination control tool 240. For example, termination control tool 240 may retrieve the device characteristics of phone call device 5 (e.g., proximity of the device buttons) or the device characteristics may be manually entered via user input.

Also, voice recognition technology may be utilized to determine if the user's name was mentioned in a preceding time period before the mute button was pressed. If the user's name was mentioned, it may be determined the user action of pressing the power/hang up button was accidental. In yet another example, the user action may be determined to be accidental when a user selects to terminate a current call when meaning to decline a second, incoming call. This may take into account, for example, an incoming personal call when the user is on a frequently used conference call number. In another example, determination module 255 may determine the phone call device 5 recently moved, such as when a phone is physically dropped and the power/hang up button is hit. This may indicate an accidental hang up. The factors listed above, both for determining if a user action was accidental or intentional, are illustrative only and not intended to be limiting. Any number of factors may be considered when making the determination. In some embodiments of the present invention, two or more factors may be considered in combination in order to determine that there is an increased probability of the likely intent of the user action.

In some embodiments, termination control tool 240 may "learn" user behavior to enhance the effectiveness and accuracy of automatically determining an intent of the user. For example, termination control 240 may learn that the user consistently presses a power/hang up button rather than a mute button when attempting to unmute a call. Alternatively or in addition, when it is determined a user action for terminating a call was likely accidental, the user may be required to perform a confirmation action prior to the call being terminated, at 430. For example, the user may be prompted to respond to a pop-up window, a sound, etc. Based on the prompt, the user may perform a confirmation response indicating the user's actual intent regarding ending the phone call session. For example, the confirmation response may include responding via a pop-up window display on a screen of phone call device 5, providing a voice response, performing the user action a second time (e.g., pressing the hang-up button), ignoring the confirmation prompt, etc. If the user action is confirmed, the call may be terminated, at 425. If the user action is not confirmed, the user may proceed with the phone call session, at 410.

In some embodiments, a user may configure preferences relating to ending a phone call session. For example, the user may predefine a desired confirmation prompt and confirmation response. In one example, the user may tailor a likelihood of an accidental hang-up action based on phone model characteristics of phone call device 5 (e.g., 'mute' button is physically close to 'end call' button). The confirmation prompts and confirmation responses listed above are exemplary only and not intended to be limiting. Other types of confirmation prompts and/or confirmation responses may be defined.

Process flowchart 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for preventing an accidental termination of the phone call session during a conversation. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for preventing an accidental termination of the phone call session during a conversation. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to preventing an accidental termination of the phone call session during a conversation. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for preventing an accidental termination of a phone call session, comprising:
   establishing the phone call session;
   receiving a user action by a user during the phone call session related to terminating the phone call session;
   determining a likely intent of the user to terminate the phone call session based on one or more predefined factors that include information regarding the phone call session and determining whether a control used to perform an expected function on a specific model of phone being utilized by the user for the phone call session is physically located proximate to a terminate control on the phone; and
   performing a phone call session action based on the likely intent.

2. The method of claim 1, further comprising continuing the phone call session when determined the user did not likely intend to terminate the phone call session.

3. The method of claim 1, further comprising terminating the phone call session when determined the user likely intended to terminate the phone call session.

4. The method of claim 1, wherein the phone call session is a one-to-one audio call, a one-to-one video call, an audio conference call with three or more participants, or a video conference.

5. The method of claim 1, wherein performing the phone call session action further comprises providing a confirmation prompt requiring a confirmation response from the user.

6. The method of claim 5, wherein the phone call session continues or is terminated based on the confirmation response.

7. The method of claim 1, further comprising:
   making a determination as to each of the one or more predefined factors, including: whether at least one of a total number of phone call session participants remains in the phone call session, whether a calendar schedule associated with the user indicates that an allocated time for the phone call session has elapsed, whether one or more words spoken by one or more phone call session participants prior to the user action indicate that the phone call session is concluding, whether a location of one or more buttons for performing an expected user action is proximate to a button on the phone call device for terminating the phone call, and whether one or more physical actions made by the user prior to the user action indicates that the user is terminating the phone call.

8. A computer system preventing an accidental termination of a phone call session, the computer system comprising:
   a memory medium comprising program instructions;
   a bus coupled to the memory medium; and
   a processor for executing the program instructions, the instructions causing the system to:
      establish the phone call session;
      receive an action by a user during the phone call session related to terminating the phone call session;
      determine a likely intent of the user to terminate the phone call session based on one or more predefined factors that include information regarding the phone call session and determine whether a control used to perform an expected function on a specific model of phone being utilized by the user for the phone call session is physically located proximate to a terminate control on the phone; and
      perform a phone call session action based on the likely intent.

9. The computer system of claim 8, further comprising program instructions to cause the system to continue the phone call session when determined the user did not likely intend to terminate the phone call session.

10. The computer system of claim 8, further comprising program instructions to cause the system to terminate the phone call session when determined the user likely intended to terminate the phone call session.

11. The computer system of claim 8, wherein the phone call session is a one-to-one audio call, a one-to-one video call, an audio conference call with three or more participants, or a video conference.

12. The computer system of claim 8, wherein instructions to perform the phone call session action further comprise program instructions to cause the system to provide a confirmation prompt requiring a confirmation response from the user.

13. The computer system of claim 12, wherein the confirmation prompt includes one of a pop-up window on a display screen or a sound, and the confirmation response includes one of a pop-up window response or a voice response.

14. The computer system of claim 12, wherein the phone call session continues or is terminated based on the confirmation response.

15. A computer program product for preventing an accidental termination of a phone call session, the computer program product comprising a computer readable storage device, and program instructions stored on the computer readable storage device, to:
   establish the phone call session;
   receive an action by a user during the phone call session related to terminating the phone call session;
   determine a likely intent of the user to terminate the phone call session based on one or more predefined factors that include information regarding the phone call session and determine whether a control used to perform an expected function on a specific model of phone being utilized by the user for the phone call session is physically located proximate to a terminate control on the phone; and
   perform a phone call session action based on the likely intent.

16. The computer program product of claim 15, further comprising program instructions to cause the system to continue the phone call session when determined the user did not likely intend to terminate the phone call session.

17. The computer program product of claim 15, further comprising program instructions to cause the system to terminate the phone call session when determined the user likely intended to terminate the phone call session.

18. The computer program product of claim 15, wherein the phone call session is a one-to-one audio call, a one-to-one video call, an audio conference call with three or more participants, or a video conference.

19. The computer program product of claim 15, wherein the instructions to perform the phone call session action further comprise program instructions to cause the system to provide a confirmation prompt requiring a confirmation response from the user.

20. The computer program product of claim 19, wherein the phone call session continues or is terminated based on the confirmation response.

\* \* \* \* \*